United States Patent
Dong et al.

(10) Patent No.: US 11,128,630 B2
(45) Date of Patent: Sep. 21, 2021

(54) USER MANAGEMENT METHOD AND APPARATUS OF HYBRID CLOUD

(71) Applicant: TENCENT TECHNOLOGY (SHENZHEN) COMPANY LIMITED, Shenzhen (CN)

(72) Inventors: Ke Dong, Shenzhen (CN); Xiaoqing Wu, Shenzhen (CN); Songjian Zheng, Shenzhen (CN); Haiwen Li, Shenzhen (CN); Zhen Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 347 days.

(21) Appl. No.: 16/200,053

(22) Filed: Nov. 26, 2018

(65) Prior Publication Data

US 2019/0098012 A1 Mar. 28, 2019

Related U.S. Application Data

(63) Continuation of application No. PCT/CN2017/093854, filed on Jul. 21, 2017.

(30) Foreign Application Priority Data

Jul. 22, 2016 (CN) .......................... 201610590964.5

(51) Int. Cl.
  *H04L 29/06* (2006.01)
  *H04L 29/08* (2006.01)
  *G06F 21/62* (2013.01)

(52) U.S. Cl.
  CPC ............ *H04L 63/102* (2013.01); *G06F 21/62* (2013.01); *H04L 63/105* (2013.01); *H04L 67/10* (2013.01);
  (Continued)

(58) Field of Classification Search
  CPC ..... H04L 63/102; H04L 63/105; H04L 67/10; H04L 67/20; H04L 67/306; H04L 67/325;
  (Continued)

(56) References Cited

U.S. PATENT DOCUMENTS

| | | | | |
|---|---|---|---|---|
| 2011/0145593 | A1* | 6/2011 | Auradkar | ............... H04L 9/006 713/189 |
| 2013/0066940 | A1* | 3/2013 | Shao | .................... H04L 67/1025 709/201 |

(Continued)

FOREIGN PATENT DOCUMENTS

| | | |
|---|---|---|
| CN | 102811260 A | 12/2012 |
| CN | 103051710 A | 4/2013 |

(Continued)

OTHER PUBLICATIONS

Shielding Applications from an Untrusted Cloud with Haven Andrew Baumann, Marcus Peinado, Galen Hunt ACM Transactions on Computer System, vol. 33, issue 3, Sep. 2015, Article No. 8, pp. 1-26 (Year: 2015).*

(Continued)

*Primary Examiner* — Samson B Lemma
*Assistant Examiner* — Mohammad S Shams
(74) *Attorney, Agent, or Firm* — Anova Law Group, PLLC

(57) ABSTRACT

Embodiments of the present application disclose a user management method and apparatus of a hybrid cloud. The user management method of a hybrid cloud is performed by a management platform of the hybrid cloud. The method includes the steps of: obtaining user data in a role-based access control (RBAC) system; determining, according to a historical record, historical user data that has been distributed to a cloud platform in the hybrid cloud; obtaining incremental data of the user data relative to the historical (Continued)

user data; and sending the incremental data to the cloud platform in the hybrid cloud.

15 Claims, 7 Drawing Sheets

(52) U.S. Cl.
CPC ............ *H04L 67/20* (2013.01); *H04L 67/306* (2013.01); *H04L 67/325* (2013.01); *H04L 67/36* (2013.01); *G06F 2221/2141* (2013.01); *H04L 67/1097* (2013.01)

(58) Field of Classification Search
CPC ..... H04L 67/63; H04L 67/1097; G06F 21/62; G06F 2221/2141
USPC ............................................................ 726/4
See application file for complete search history.

(56) References Cited

U.S. PATENT DOCUMENTS

| | | | | | |
|---|---|---|---|---|---|
| 2013/0117240 | A1* | 5/2013 | Taylor | ................... | G06F 16/182 707/690 |
| 2013/0124453 | A1* | 5/2013 | Bhide | ................... | G06F 16/254 707/602 |
| 2013/0304903 | A1* | 11/2013 | Mick | ....................... | H04L 67/10 709/224 |
| 2014/0059226 | A1* | 2/2014 | Messerli | ............... | H04L 47/783 709/226 |
| 2014/0214915 | A1* | 7/2014 | Dragon | ................. | H04L 67/306 709/201 |
| 2014/0282889 | A1* | 9/2014 | Ishaya | ................. | H04L 63/0876 726/4 |
| 2015/0200943 | A1* | 7/2015 | Pitre | ....................... | G06F 21/45 726/1 |
| 2015/0334119 | A1* | 11/2015 | Schmitt | ............. | H04W 12/0804 726/3 |
| 2016/0112455 | A1* | 4/2016 | Zhou | ....................... | H04L 29/08 726/1 |
| 2017/0048319 | A1* | 2/2017 | Straub | ............... | H04W 12/0027 |
| 2017/0206353 | A1* | 7/2017 | Jai | ........................ | H04L 67/1097 |
| 2018/0191867 | A1* | 7/2018 | Siebel | .................... | H04L 67/12 |
| 2020/0225655 | A1* | 7/2020 | Cella | ................ | G05B 19/41865 |

FOREIGN PATENT DOCUMENTS

| | | |
|---|---|---|
| CN | 104980455 A | 10/2015 |
| CN | 105593835 A | 5/2016 |

OTHER PUBLICATIONS

MapReduce scheduling in hybrid cloud with multi-level privacy Toon Degryse, Sucha Smanchat iiWAS '15: Proceedings of the 17th International Conference on Information Integration and Web-based Applications & Services. Dec. 2015, Article No. 86, pp. 1-4 (Year: 2015).*

Security Implications of Blockchain Cloud with Analysis of Blockchain Withholding Attack Deepak K. Tosh, Sachin Shetty, Xueping Liang, Charles A. Kamhoua, Kevin A. Kwiat, Laurent Njilla CCGrid'17: Proceedings of the 17th IEEE/ACM International Symposium on Cluster, Cloud and Grid Computing, pp. 458-467 (Year: 2017).*

The World Intellectual Property Organization (WIPO) International Search Report for PCT/CN2017/093854 dated Oct. 26, 2017 5 Pages (including translation).

* cited by examiner

USER MANAGEMENT METHOD AND APPARATUS OF HYBRID CLOUD

RELATED APPLICATION

The present application claims priority to PCT Application PCT/CN2017/093854 filed on Jul. 21, 2017, which claims priority to Chinese Patent Application No. 201610590964.5, entitled "USER MANAGEMENT METHOD AND APPARATUS OF HYBRID CLOUD," filed with the Patent Office of China on Jul. 22, 2016. The two applications are incorporated by reference in their entirety.

FIELD OF THE TECHNOLOGY

The present disclosure relates to the field of computer technologies, and in particular, to a user management method and apparatus for a hybrid cloud.

BACKGROUND OF THE DISCLOSURE

A public cloud is a cloud architecture that is provided by a third party for use by the public or by many business groups. The public cloud architecture provides cloud resources on a network, and all users having user permissions may use the resources as needed. High efficiency, low costs, and usage on demand are prominent advantages of the public cloud. However, the public cloud is also faced with problems, such as it lacks security guarantees required by certain enterprise or personal/business data. A private cloud is built at the center of data owned by an enterprise or an organization, or is built by a cloud service provider according to user demand. Except the owner, other users cannot use the private cloud. This can ensure integrity and security of data in a private cloud.

The private cloud computing environment is mainly oriented to enterprise users. Considering the security requirements, enterprises are more willing to deposit data in a private cloud, but they also want to benefit from the computing resources of the public cloud. In this case, a hybrid cloud architecture emerges. An existing hybrid cloud usually combines at least two private clouds and at least one public cloud.

However, cloud platforms in a hybrid cloud often have different user management methods, and the existing hybrid cloud lacks a solution to uniformly manage user data and user permissions in the hybrid cloud.

SUMMARY

Embodiments of the present application provide a user management method and apparatus for a hybrid cloud to consistently manage users in cloud platforms in the hybrid cloud.

According to a first aspect, an embodiment of the present disclosure provides a user management method of a hybrid cloud. The user management method of a hybrid cloud is performed by a management platform of the hybrid cloud. The method includes the steps of: obtaining user data in a role-based access control (RBAC) system; determining, according to a historical record, historical user data that has been distributed to a cloud platform in the hybrid cloud; obtaining incremental data of the user data relative to the historical user data; and sending the incremental data to the cloud platform in the hybrid cloud.

According to a second aspect, an embodiment of the present disclosure provides a user management apparatus for a hybrid cloud. The user management apparatus for a hybrid cloud may include a first obtaining module, configured to obtain user data in a role-based access control RBAC system, and a determining module, configured to determine, according to a historical record, historical user data that has been distributed to a cloud platform in the hybrid cloud. The user management apparatus may further include a second obtaining module, configured to obtain incremental data of the user data relative to the historical user data; and a sending module, configured to send the incremental data to the cloud platform in the hybrid cloud.

According to a third aspect, an embodiment of the present application provides a user management apparatus of a hybrid cloud. The apparatus may include a transceiver, a processor, and a storage medium. The storage medium stores computer instructions. When the processor executes the computer instructions, the processor is configured to: obtain user data in a role-based access control RBAC system; determine, according to a historical record, historical user data that has been distributed to a cloud platform in the hybrid cloud; and obtain incremental data of the user data relative to the historical user data, wherein the transceiver is configured to send the incremental data to the cloud platform in the hybrid cloud.

According to a fourth aspect, an embodiment of the present application provides a non-volatile storage medium, configured to store one or more computer programs. The computer programs include instructions that can be run by a processor. When the instructions are executed by the processor, the computer programs enable the processor to perform the method of: obtaining user data in a role-based access control RBAC system; determining, according to a historical record, historical user data that has been distributed to a cloud platform in the hybrid cloud; obtaining incremental data of the user data relative to the historical user data; and sending the incremental data to the cloud platform in the hybrid cloud.

In the embodiments of the present application, the user data are periodically obtained from the RBAC system, and the user data are compared with user data that is locally stored in the hybrid cloud and that has been sent to the cloud platforms of the hybrid cloud, to determine the incremental data. The incremental data are then sent to all the cloud platforms in the hybrid cloud. Accordingly, the user data of the cloud platforms in the hybrid cloud can be synchronized. In addition, because the user data of the cloud platform all come from the RBAC system, a permission of a user is associated with a role of the user in the RBAC system, and consistent permission management can be performed on the user data of the cloud platforms in the hybrid cloud by using the RBAC system.

BRIEF DESCRIPTION OF THE DRAWINGS

To describe the technical solutions in the embodiments of the present disclosure or in the existing technology more clearly, the following briefly describes the accompanying drawings required for describing the embodiments or the existing technology. Apparently, the accompanying drawings in the following description show merely some embodiments of the present disclosure, and a person of ordinary skill in the art may still derive other drawings from these provided accompanying drawings without creative efforts.

DESCRIPTION OF EMBODIMENTS

Figure 1:
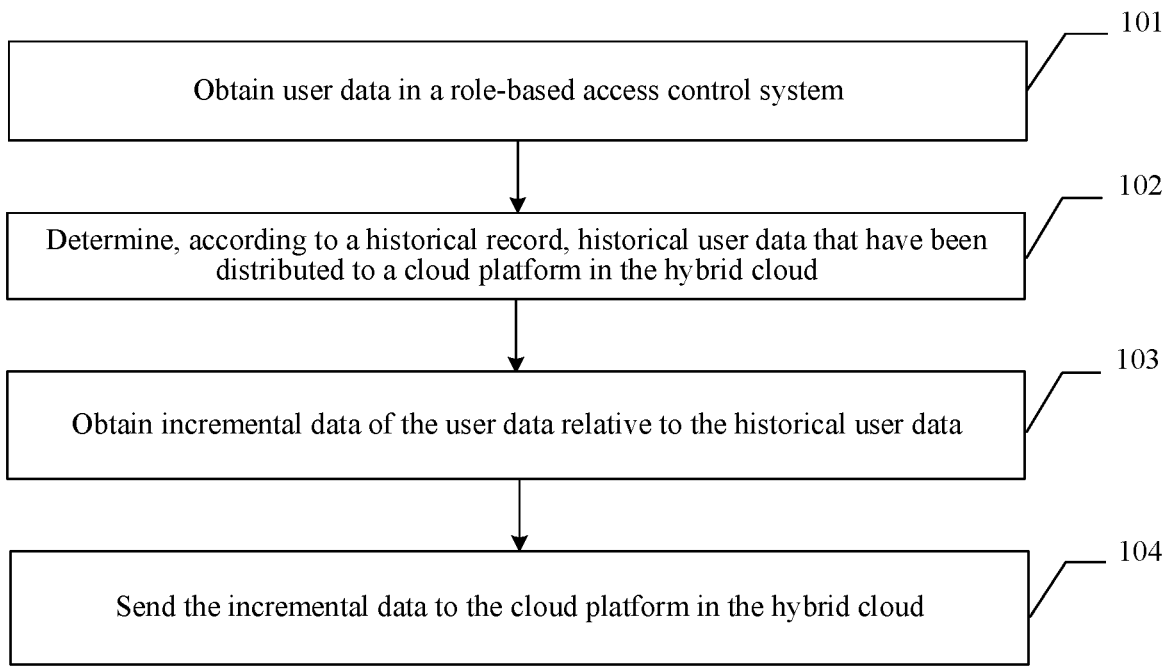
FIG. 1 is a schematic flowchart of an embodiment of a user management method of a hybrid cloud according to the present application.

Referring to FIG. 1, FIG. 1 is a schematic flowchart of an embodiment of a user management method of a hybrid cloud according to the present application. As shown in FIG. 1, the user management method of a hybrid cloud includes the following steps.

101: Obtain user data in a role-based access control (RBAC) system.

In this embodiment, an RBAC system is introduced to consistently manage users, roles, and permissions in a hybrid cloud platform. The RBAC system is a system for managing user data. In the RBAC system, the users, roles, and permissions are used as basic management elements. A user may be an entity that can independently access data or may be an entity that can be presented by data. A role is a job or position in an organization or a task. A permission is an operation allowed to be performed on one or more objects. In the RBAC system, a user may be authorized to own multiple roles, a role may be associated with at least one user, one role may be associated with at least one permission, and one permission may be associated with at least one role. A basic idea of the RBAC system is that a permission authorized to a user is determined by a role of the user. In the RBAC system, a permission is associated with a role, the role is associated with a user, and the user is not directly associated with the permission.

Figure 2:
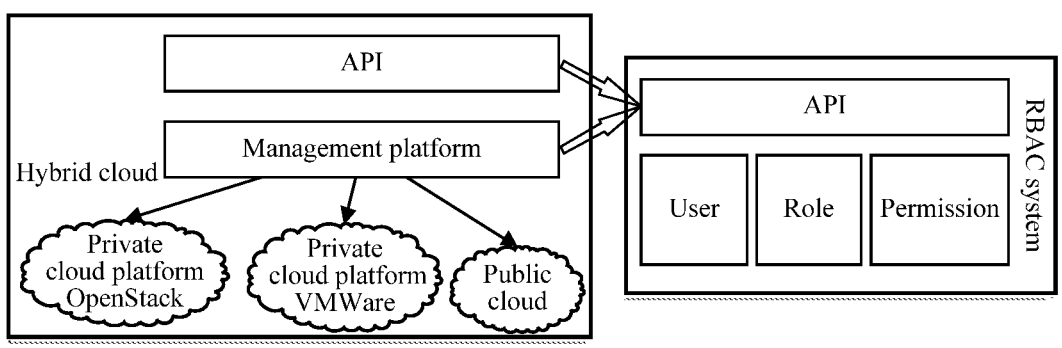
FIG. 2 is a schematic structural diagram of an embodiment of a role-based access control system of a hybrid cloud according to the present application.

As shown in FIG. 2, FIG. 2 is a schematic structural diagram of an embodiment of a hybrid cloud and an RBAC system according to the present application. The hybrid cloud includes at least two cloud platforms, and the cloud platform may be a private cloud platform and/or a public cloud platform. At least some cloud platforms in the hybrid cloud respectively belong to different cloud architecture types. For example, as shown in FIG. 2, the hybrid cloud may include two private cloud platforms and one public cloud platform. The two private cloud platforms may be respectively private cloud platforms of an OpenStack type and a VMWare type. The hybrid cloud may further include a management platform and an application programming interface (API). The management platform may be configured to consistently manage cloud platforms in the hybrid cloud. The management platform of the hybrid cloud may include a database, a processor, and the like. The API of the hybrid cloud may be an access interface that is externally provided by the hybrid cloud and that is related to a user. The API may be mainly oriented to platform users, and the interface may be an interface through which the hybrid cloud as a platform externally provides services. When a user accesses the interface, the difference between lower-level cloud platforms is transparent to the user.

The RBAC system may include the API. An operation may be performed on resources within the RBAC system by using the API.

The API of the hybrid cloud may generate a new user data in the RBAC system by using a receiving operation. The RBAC system may consistently manage the user data. In this embodiment, the user data may include at least one piece of data, and each piece of data may include operation content and an operation object. For example, the hybrid cloud may add a new user in the RBAC system by using a receiving operation, and allocate a role to the user. The operation content in corresponding data may be newly added data, and an operation object may be the user and the corresponding role.

Often generating the user data in the RBAC system is not performed within a time period, but rather this task often takes place continuously. Therefore, the management platform of the hybrid cloud needs to periodically obtain the user data from the RBAC system. The periodically obtaining the user data refers to obtaining the user data every preset time period, or obtaining the data at a preset time point, or obtaining the user data when an instruction is received. This is not limited herein.

102: Determine, according to a historical record, historical user data that have been distributed to a cloud platform in the hybrid cloud.

The management platform in the hybrid cloud needs to distribute the user data obtained from the RBAC system to the cloud platforms. Specifically, the management platform stores in a local database the user data that were previously obtained from the RBAC system and that have been successfully distributed to the cloud platforms. Each time the user data are sent to the cloud platforms, the management platform also marks data that is successfully sent, to indicate that the piece of data has been sent to the cloud platforms. In this embodiment, the historical record includes a mark for data that is successfully sent.

103: Obtain incremental data of the user data relative to the historical user data.

After the management platform of the hybrid cloud obtains all the user data from the RBAC system, because at least a part of the user data has been sent to the cloud platforms, to avoid repeatedly sending data, the management platform compares all the user data obtained from the RBAC system with the historical user data recorded in the historical records to select the incremental data, that is, data that is not sent to the cloud platforms, from all the user data. The incremental data are stored in the local database.

104: Send the incremental data to the cloud platform in the hybrid cloud.

After selecting the incremental data, the management platform of the hybrid cloud sends the incremental data to the cloud platforms in the hybrid cloud, so that the user data in the cloud platforms are kept consistent, thereby facilitating the operations of the management platform.

Specifically, a database is set up in the management platform, and the database stores configuration information of the cloud platforms. The configuration information may include an Internet Protocol (IP) address between networks of the API, ports, user authentication information, and the like, that are provided by the cloud platform. The management platform sends the incremental data to the cloud platforms according to configuration information of the cloud platforms.

The method shown in FIG. 1 may be performed by the management platform of the hybrid cloud. The management platform may include one or more processors.

In this embodiment, the user data are periodically obtained from the RBAC system, and the user data are compared with user data that are locally stored in the hybrid cloud and that have been sent to the cloud platforms of the hybrid cloud, to determine the incremental data. Then the incremental data are sent to all the cloud platforms in the hybrid cloud. In this way, the user data of the cloud platforms in the hybrid cloud can be made to be uniformly distributed. In addition, because the user data of the cloud platform all come from the RBAC system, a permission of a user is associated with a role of the user in the RBAC system, and consistent permission management can be performed on the user data of the cloud platforms in the hybrid cloud by using the RBAC system.

Figure 3:
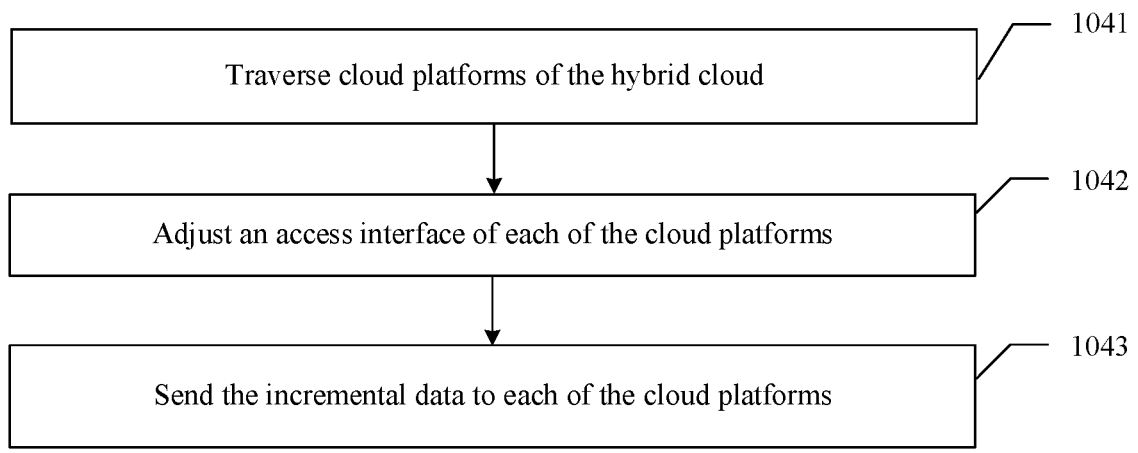
FIG. 3 is a schematic flowchart of an embodiment of sending incremental data to cloud platforms in a hybrid cloud according to the present application.

In some embodiments, because the types of the cloud platforms in the hybrid cloud are usually different, the types of access interfaces provided by the cloud platforms may also be different. Therefore, in one embodiment, as shown in FIG. 3, the sending the incremental data to the cloud platform in the hybrid cloud may include the following steps.

1041: Traverse cloud platforms of the hybrid cloud.

The incremental data needs to be synchronized to each cloud platform in the hybrid cloud. After the incremental data are obtained, all the cloud platforms in the hybrid cloud are traversed. The incremental data needs to be sent to each traversed cloud platform. In this way, it can be ensured that the hybrid cloud consistently manages user permissions of all the cloud platforms.

1042: Adjust an access interface of each of the cloud platforms.

After traversing of the cloud platforms is completed, because the cloud platforms provide different interfaces of users, roles, and permissions, an access interface of each cloud platform needs to be adjusted.

1043: Send the incremental data to each of the cloud platforms.

After adaption of interfaces of the cloud platforms is completed, the incremental data are sent to the cloud platforms by using the adapted interfaces.

Specifically, in one embodiment, the access interfaces of the cloud platforms in the hybrid cloud are adjusted by using a preset adapter. The preset adapter may be associated with a standard adaptee interface; the incremental data are sent to the access interface of the cloud platform by using the preset adapter. A specific adaptee type of the standard adaptee interface is the access interface of each cloud platform in the hybrid cloud.

An adapter, a standard adaptee interface, and a specific adapter type in this embodiment are described below by using user interfaces as an example. For roles and permissions, refer to descriptions of the user interfaces.

In one embodiment, the adapter is specifically UserAdapter, and is a type for the management platform in the hybrid cloud to call. The adapter UserAdapter is associated with a standard adaptee interface IUserAdaptee and provides operation methods such as Create, Update, Get, and Delete.

A corresponding operation method of a specific implementation type of IUserAdaptee is called in each operation method. For example, a specific instance object of IUserAdaptee is a cloud platform AWSPrivateCloudAdaptee, and a Create operation method of the cloud platform AWSPrivateCloudAdaptee is specifically performed in a Create operation method of the adapter UserAdapter. A design advantage of adapter-type UserAdapter is that all provided methods are consistent for upper-layer user callings, the difference in interfaces between specific lower-level cloud platforms are shielded from the user, and specific lower-level clouds are accessed by associating specific adaptee types.

A standard adaptee interface IUserAdaptee is a standard interface designed for access interfaces of all the cloud platforms in the hybrid cloud when the management platform performs encapsulation. IUserAdaptee provides standard operations and parameters to the access interfaces when encapsulating access interfaces of the cloud platforms in the hybrid cloud. The provided standard operations include general operations such as creation, deletion, update, and modification, and general parameters such as Name, Password, and Email are provided as well. A specific encapsulation type of each cloud platform in the hybrid cloud is implemented as the standard adaptee interface IUserAdaptee, and a specific adaptee type is turned into, for the adapter UserAdapter to associate, to call a method of different specific cloud platforms by using consistent interfaces.

Specific adapter types implemented as the standard adaptee interface are, for example, AWSPrivateCloudUserAdaptee, OpenStackPrivateCloudUserAdaptee, and QQCloudUserAdaptee. AWSPrivateCloudUserAdaptee is a user interface in which a private cloud platform of an AWS type is encapsulated. OpenStackPrivateCloudUserAdaptee is a user interface in which a private cloud of an OpenStack type is encapsulated. QQCloudUserAdaptee is a user interface in which the Tencent Cloud is encapsulated.

Figure 4:
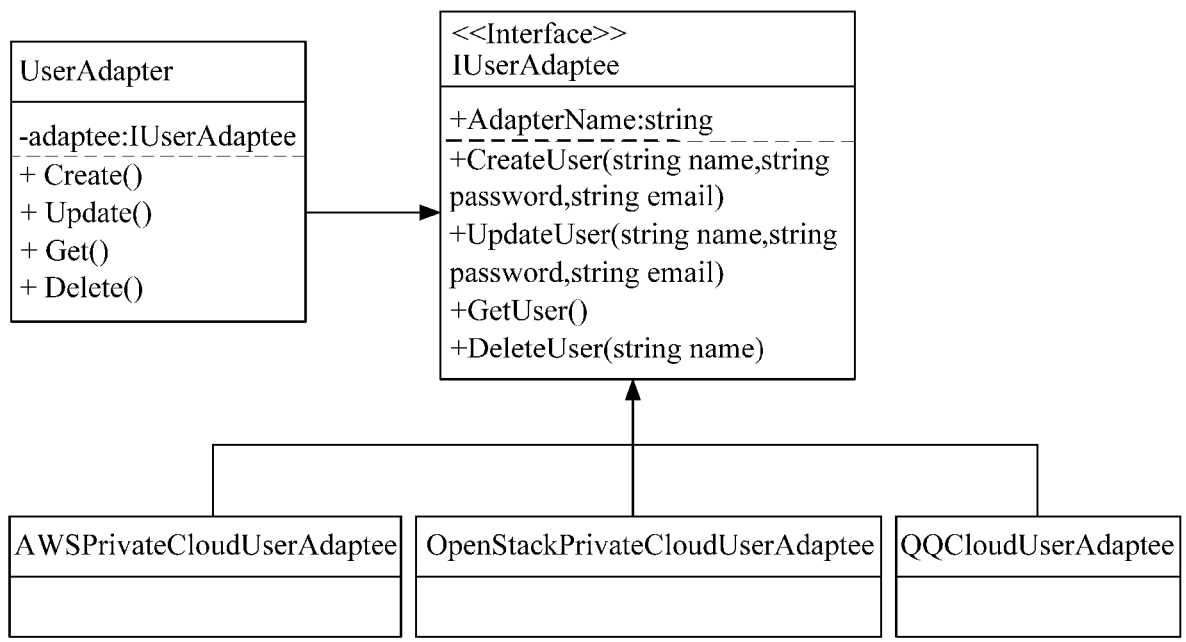
FIG. 4 shows an example of adaption of cloud platform interfaces according to the present application.

FIG. 4 shows one embodiment of adaption of cloud platform interfaces.

If a standard interface method cannot satisfy access to all the cloud platforms in the hybrid cloud, a re-write specific method may also be supported. In addition, a standard adaptee interface further provides sufficient expansibility. When a new cloud platform is connected to the hybrid cloud, only the adaptee interface IUserAdaptee needs to be encapsulated into a specific adaptee type, and upper-layer call relationships remain the same.

Figure 5:
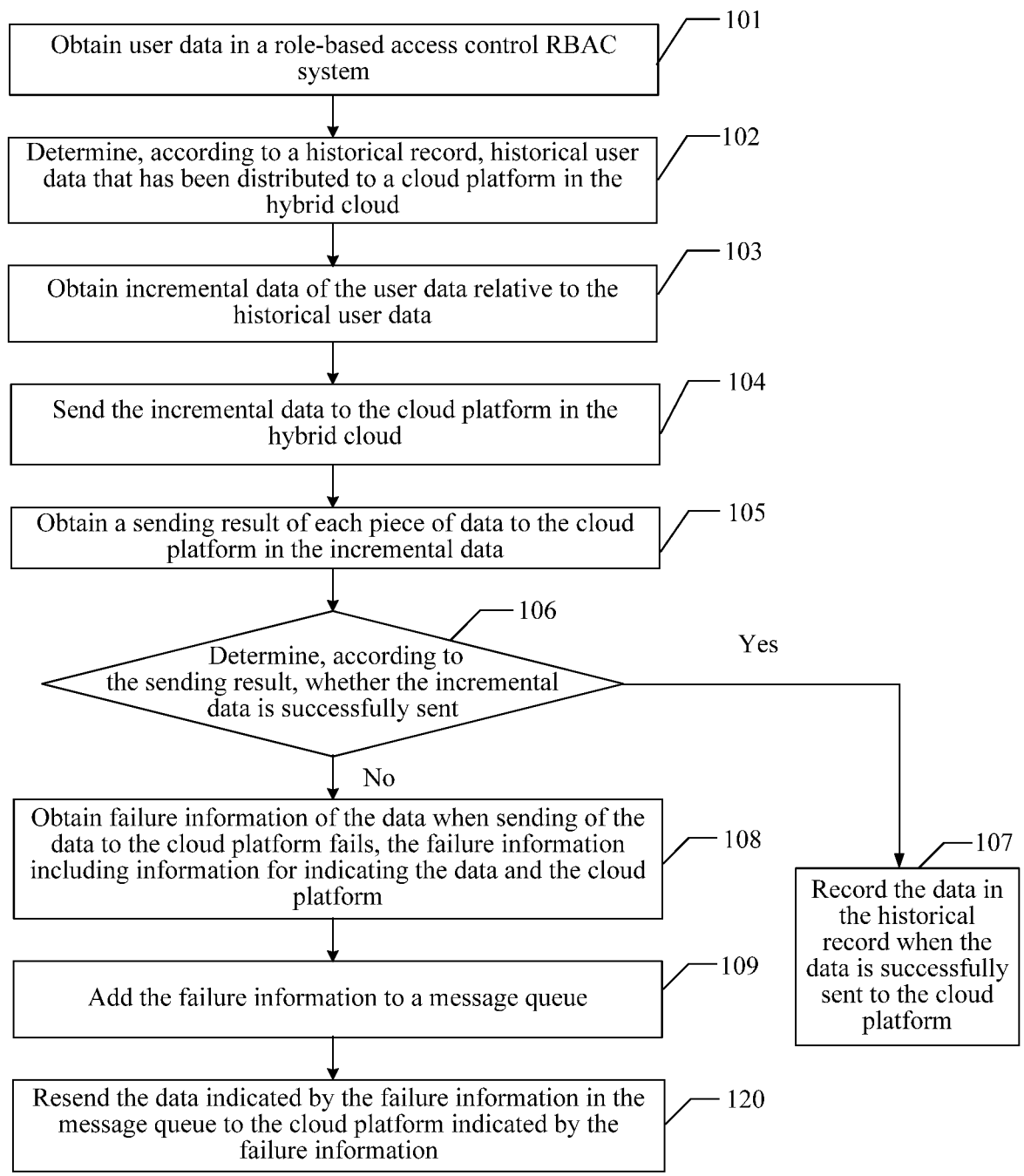
FIG. 5 is a schematic flowchart of another embodiment of a user management method of a hybrid cloud according to the present application.

As shown in FIG. 5, FIG. 5 is a schematic flowchart of another embodiment of a user management method of a hybrid cloud according to the present application. This embodiment is based on the embodiment shown in FIG. 1. After step 104 in the foregoing embodiment shown in FIG. 1, the user management method of a hybrid cloud in this embodiment of the present application further includes:

105: Obtain a sending result of each piece of data to the cloud platform in the incremental data.

When the management platform sends the incremental data to the cloud platform, the API of the cloud platform sends back a receiving result of each piece of data, and the management platform may determine a sending result of each piece of data to the cloud platform by using a feedback result.

106: Determine, according to the result, whether the incremental data are successfully sent to the cloud platform.

107: Record the data in the historical record when the data are successfully sent to the cloud platform.

For each piece of data in the incremental data, when the data are successfully sent to the cloud platform, a mark for the data are added in the historical record. In this way, it can be avoided that the piece of data are subsequently repeatedly sent to the cloud platform.

In some embodiments, when the data are sent to the cloud platform, a sending failure may occur. Therefore, the user management method of a hybrid cloud in this embodiment further includes:

108: Obtain failure information of the data when sending of the data to the cloud platform fails, the failure information including information for indicating the data and the cloud platform.

Specifically, for example, failure information of one piece of data may be as follows:

```
{
  "Name": "user1",
  "ActionType":"Create",
  "AdapteeName":"QQCloudAdapatee",
}
```

109: Add the failure information to a message queue.

110: Resend the data indicated by the failure information in the message queue to the cloud platform indicated by the failure information.

Figure 6:
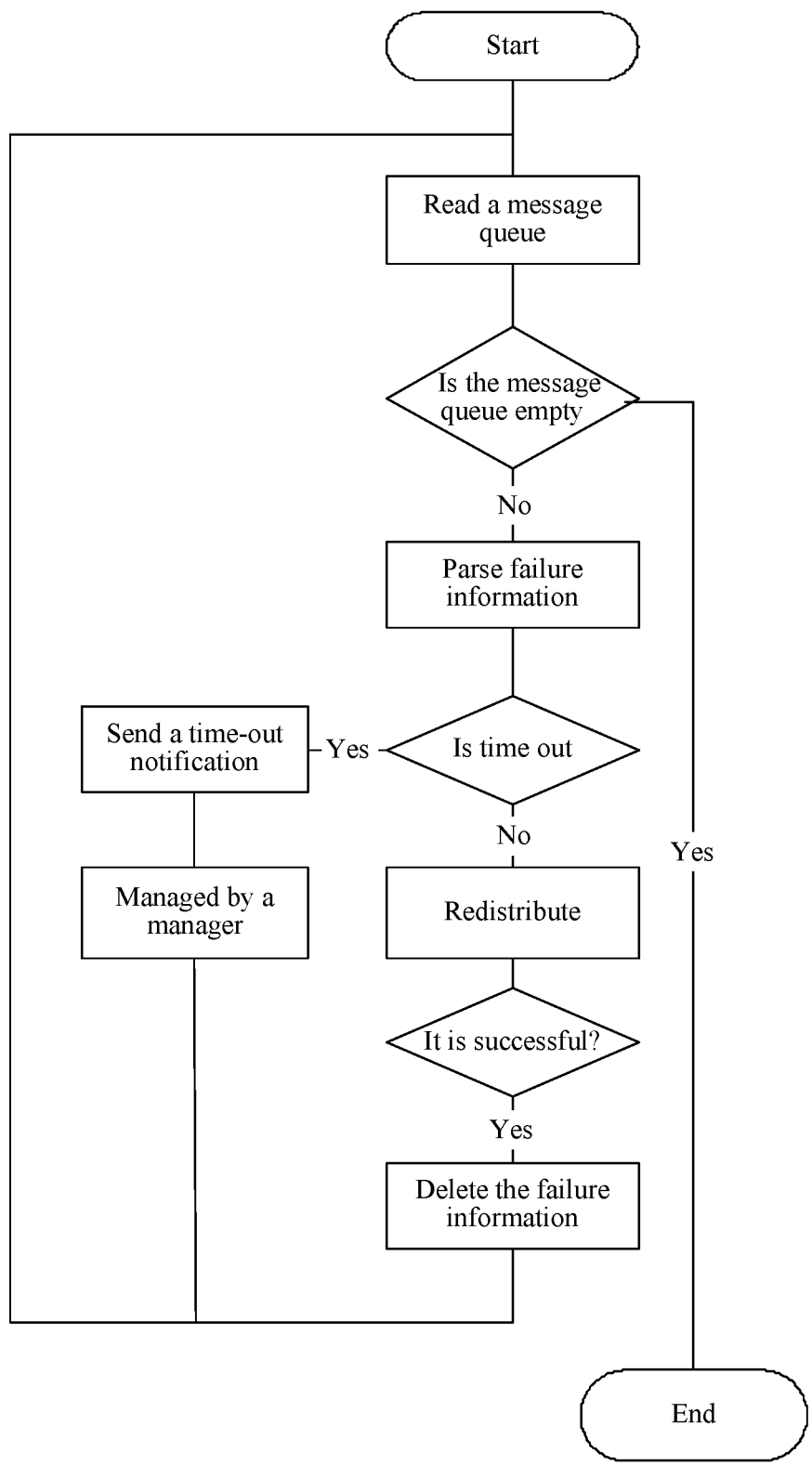
FIG. 6 is a schematic flowchart of an embodiment of a sending failure processing method according to the present application.

Specifically, failure information in the message queue may be processed by periodically executing a background Job. In some embodiments, there are multiple reasons for failure of sending of data to the cloud platform. For example, the reasons may be a network reason, or an internal error of a cloud platform interface, or other reasons. For failure of sending of data caused by some reasons, sending succeeds when the data are sent again; for failure of sending of data caused by the other reasons, sending still fails when the data are sent again. Therefore, in one embodiment, the failure information further includes an occurrence time of failure of sending of the data to the cloud platform. As shown in FIG. 6, FIG. 6 is a schematic flowchart of an embodiment of a sending failure processing method in this embodiment.

When the message queue is read, each piece of the failure information is parsed. Specifically, failure information shown below is used as an example.

```
{
  "Name": "user1",
  "ActionType":"Create",
  "AdapteeName":"QQCloudAdapatee",
  "StartTime":"2016-03-30 10:05:02.187"
}
```

Values of Name, ActionType, AdapteeName, and StartTime fields shown in the foregoing structure may be extracted from the failure information, other information of User1 may be obtained from an RBAC user management system according to the value of the Name field, and that a user distribution operation is Create may be determined according to the value of the ActionType field. That a target cloud platform QQCloudAdapatee may be determined according to the value of the AdapteeName field. The occurrence time in the failure information may be obtained according to the value of the StartTime field, a current time is obtained, and whether a distance between the current time and the occurrence time is greater than a threshold may be determined. If yes, it indicates that the failure information is time out, that is, the failure information is not successfully sent after at least twice resending, and then a time-out notification may be sent. The time-out notification includes the failure information. Specifically, the time-out notification may be sent via an email, so that a manager may process the failure information. If the distance between the current time and the occurrence time is not greater than the threshold, other information of User1 obtained from the RBAC system may be resent to QQCloudAdapatee according to the failure information. If the information is successfully sent, the failure information may be deleted from the message queue. If not, the failure information may be reserved in the message queue and waits to be processed at a next period of the background Job.

The steps in the foregoing embodiments shown in FIG. 5 may be performed by the management platform of the hybrid cloud. The management platform may include one or more processors.

The user management method of a hybrid cloud in the present disclosure is described above, and a user management apparatus of a hybrid cloud in the present disclosure is described below.

Figure 7:
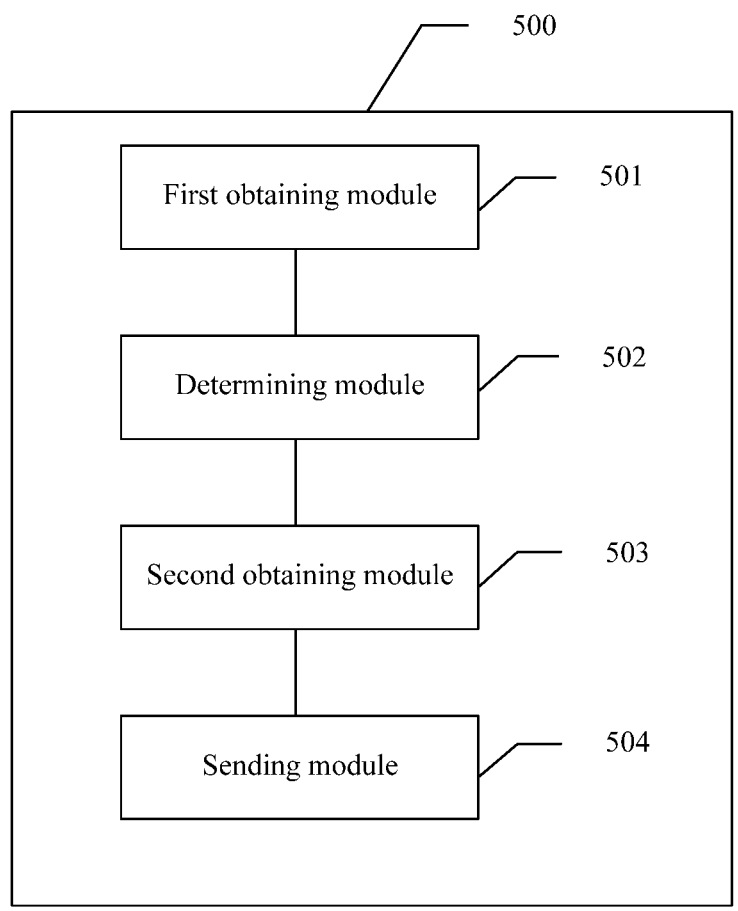
FIG. 7 is a schematic structural diagram of an embodiment of a user management apparatus of a hybrid cloud according to the present application.

As shown in FIG. 7, FIG. 7 is a schematic structural diagram of an embodiment of a user management apparatus of a hybrid cloud according to the present application. In this embodiment, the user management apparatus 500 of a hybrid cloud includes: a first obtaining module 501, configured to obtain user data in a role-based access control RBAC system; a determining module 502, configured to determine, according to a historical record, historical user data that has been distributed to a cloud platform in the hybrid cloud; a second obtaining module 503, configured to obtain incremental data of the user data relative to the historical user data; and a sending module 504, configured to send the incremental data to the cloud platform in the hybrid cloud.

In this embodiment, the user data may be periodically obtained from the role-based access control RBAC system, and the user data may be compared with user data that is locally stored in the hybrid cloud and that has been sent to the cloud platforms of the hybrid cloud, to determine the incremental data. Then the incremental data may be sent to all the cloud platforms in the hybrid cloud. In this way, the user data of the cloud platforms in the hybrid cloud can be synchronized. In addition, because the user data of the cloud platform all comes from the RBAC system, a permission of a user is associated with a role of the user in the RBAC system, and consistent permission management can be performed on the user data of the cloud platforms in the hybrid cloud by using the RBAC system.

In one embodiment, the sending module 504 is specifically configured to: adjust an access interface of the cloud platform in the hybrid cloud by using a preset adapter, the preset adapter being associated with a standard adaptee interface, and the access interface of the cloud platform being encapsulated in the standard adaptee interface; and send the incremental data to the access interface of the cloud platform by using the preset adapter and the standard adaptee interface.

Figure 8:
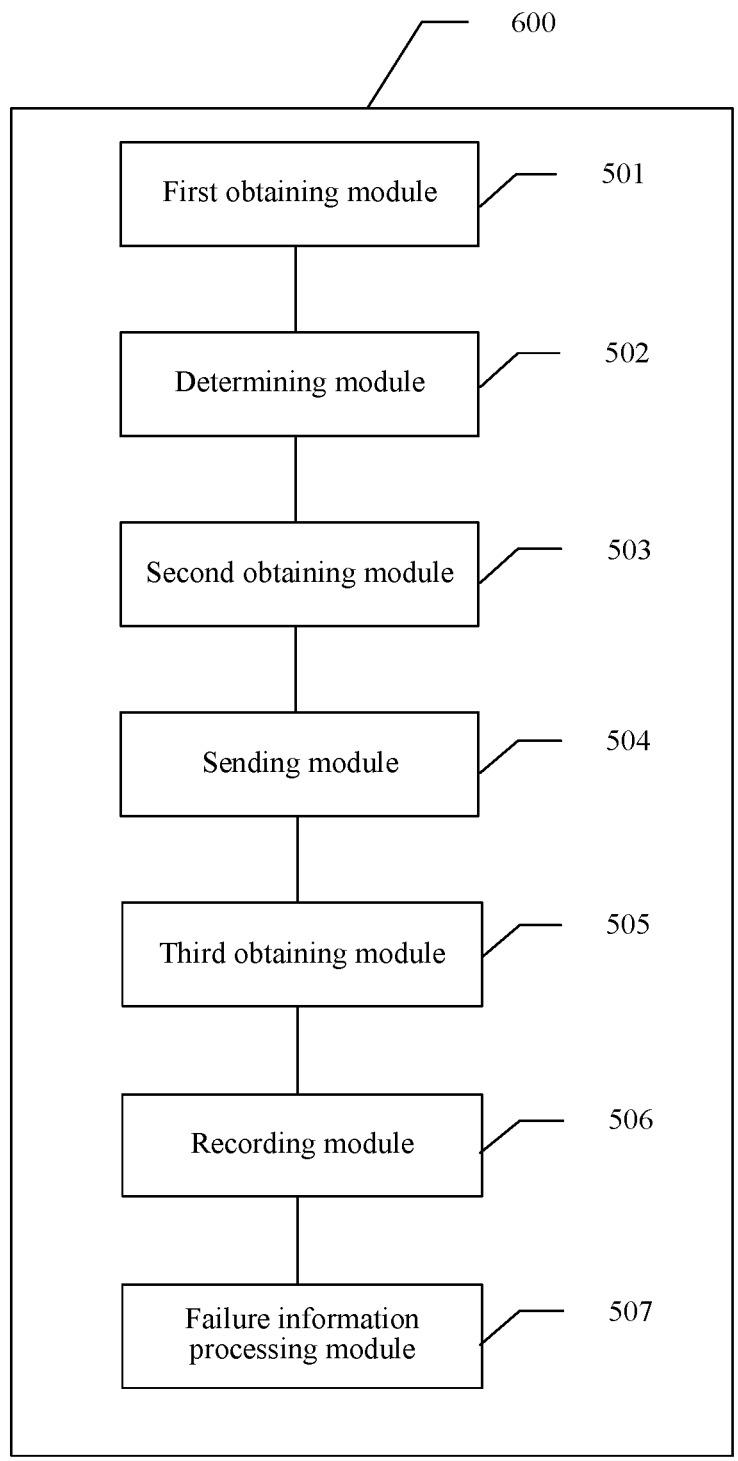
FIG. 8 is a schematic structural diagram of another embodiment of a user management apparatus of a hybrid cloud according to the present application.

In one embodiment, as shown in FIG. 8, FIG. 8 is a schematic structural diagram of another embodiment of a user management apparatus of a hybrid cloud according to the present application. In this embodiment, the incremental data includes at least one piece of data, and in addition to modules 501 to 504 shown in FIG. 7, the user management apparatus 600 of a hybrid cloud further includes: a third obtaining module 505, configured to obtain a sending result of each piece of data to the cloud platform in the incremental data; and a recording module 506, configured to record the data in the historical record when the data are successfully sent to the cloud platform.

In one embodiment, the user management apparatus 600 of a hybrid cloud further includes: a failure information processing module 507, configured to: obtain failure information of the data when sending of the data to the cloud platform fails, the failure information including information for indicating the data and the cloud platform; add the failure information to a message queue; and resend the data indicated by the failure information in the message queue to the cloud platform indicated by the failure information.

Further, in one embodiment, the failure information further includes an occurrence time of failure of sending of the data to the cloud platform; and the failure information processing module 507 is further configured to: obtain a current time; and send a time-out notification when a distance between the current time and the occurrence time is greater than a threshold, the time-out notification including the failure information.

Figure 9:
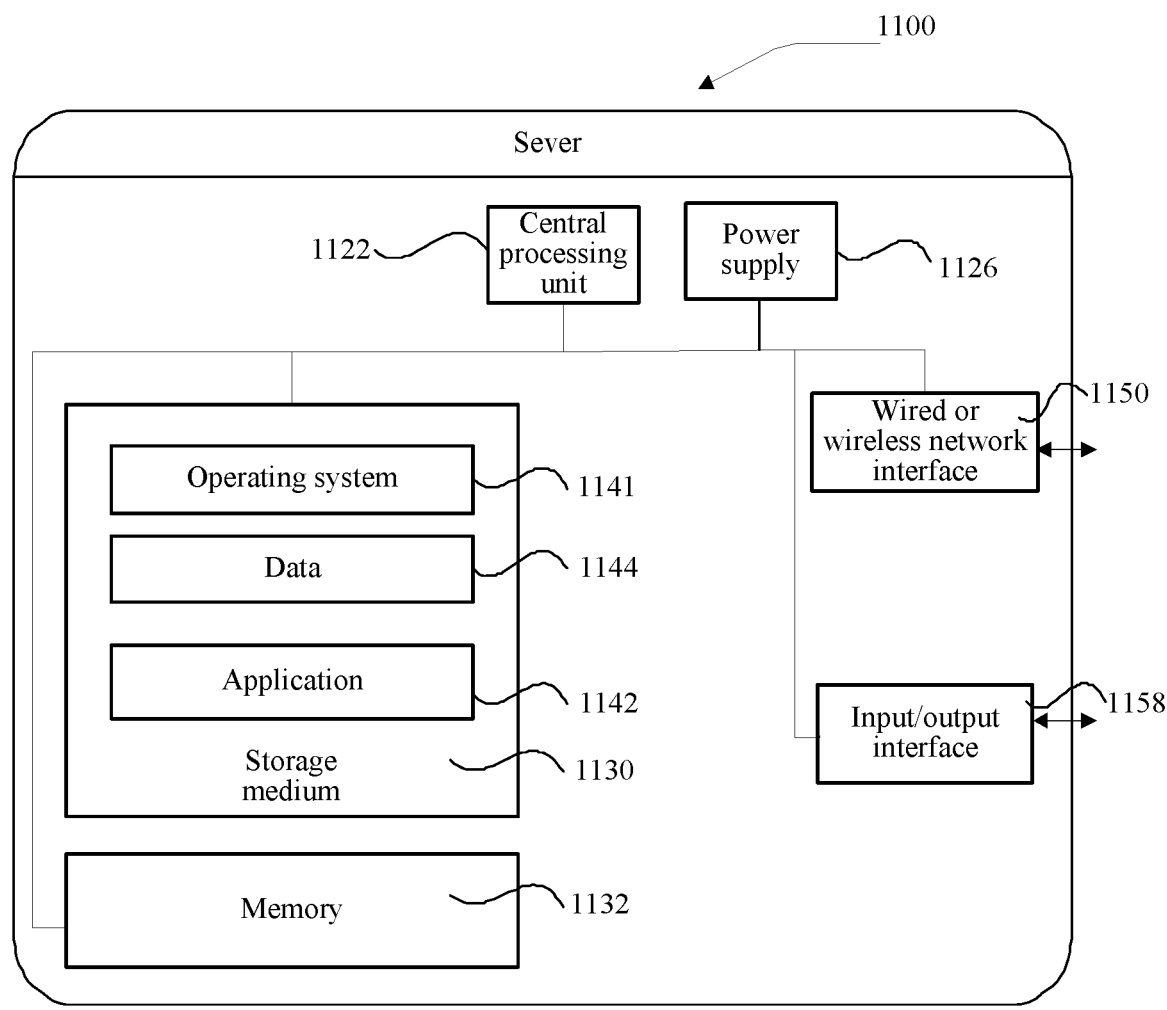
FIG. 9 is a schematic structural diagram of a server according to an embodiment of the present application.

Referring to FIG. 9, FIG. 9 is a schematic structural diagram of a server according to an embodiment of the present application. The hybrid cloud in this embodiment of the present application may be implemented in the server. The server 1100 may vary greatly due to different configurations or performance, and may include one or more central processing units (CPU) 1122 (for example, one or more processors) and a memory 1132, and one or more storage media 1130 (for example, one or more mass storage devices) that store applications 1142 or data 1144. The memory 1132 and the storage medium 1130 may be transient or persistent storages. Computer programs stored in the storage medium 1130 may include one or more modules (not shown in the figure), and each module may include a series of instructions and operations for the server. Still further, the CPU 1122 may be configured to communicate with the storage medium 1130, and perform, on the server 1100, a series of instructions and operations in the storage medium 1130. In embodiments of the present disclosure, each functional module as described in this application may refer to the computer programs stored in a computer storage medium (e.g., 1130), when executed by a processor, the computer programs perform the functions described in relation to the function module. Further, in embodiments of the present disclosure, a functional module may refer to software components as well as hardware components, which may work together to implement the functions of a specific module.

The server 1100 may further include one or more power supplies 1126, one or more wired or wireless network interfaces 1150 (for example, transceivers), one or more input/output interfaces 1158, and/or one or more operating systems 1141, for example, Windows Server™, Mac OS X™, Unix™, Linux™, or FreeBSD™.

The foregoing apparatus for performing method steps in the embodiments shown in FIG. 1, FIG. 5, and FIG. 6 may be based on the server structure shown in FIG. 9.

Specifically, when executing the instructions stored in the storage medium 1130, the processor 1122 performs: obtaining user data in a role-based access control RBAC system; determining, according to a historical record, historical user data that have been distributed to a cloud platform in the hybrid cloud; and obtaining incremental data of the user data relative to the historical user data; and the transceiver being configured to send the incremental data to the cloud platform in the hybrid cloud.

In one embodiment, the processor is further configured to: adjust an access interface of the cloud platform in the hybrid cloud by using a preset adapter, the preset adapter being associated with a standard adaptee interface, and the access interface of the cloud platform being encapsulated in the standard adaptee interface; and the transceiver is configured to send the incremental data to the access interface of the cloud platform by using the preset adapter and the standard adaptee interface.

In one embodiment, the incremental data includes at least one piece of data, and the processor is further configured to: obtain a sending result of each piece of data to the cloud platform in the incremental data; and record the data in the historical record when the data are successfully sent to the cloud platform.

In one embodiment, the processor is further configured to: obtain failure information of the data when sending of the data to the cloud platform fails, the failure information including information for indicating the data and the cloud platform; and add the failure information to a message queue; and the transceiver is further configured to resend the data indicated by the failure information in the message queue to the cloud platform indicated by the failure information.

In one embodiment, the failure information further includes an occurrence time of failure of sending of the data to the cloud platform. The processor is further configured to: obtain a current time; and send a time-out notification when a distance between the current time and the occurrence time is greater than a threshold, the time-out notification including the failure information.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated units may be implemented in a form of hardware or may be implemented in a form of a software functional unit.

If implemented in the form of software functional units and sold or used as an independent product, the integrated units may be stored in a computer-readable storage medium. Based on such an understanding, the technical solutions of the present disclosure essentially, or the part contributing to the existing technology, or all or a part of the technical solutions may be implemented in a form of a software product. The computer software product is stored in a storage medium and includes several instructions for instructing one or more computer devices (which may be a personal computer, a server, a network device, or the like) to perform all or a part of steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

As stated above, the above embodiments are merely provided for describing the technical solutions of the present disclosure, but not intended to limit the present disclosure. It should be understood by persons of ordinary skill in the art that although the present disclosure has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present disclosure.

What is claimed is:

1. A user management method of a hybrid cloud performed by a management platform of the hybrid cloud, comprising:
    obtaining, by the management platform, user data in a role-based access control (RBAC) system, the user data being uniformly managed in all cloud platforms in the hybrid cloud, the hybrid cloud including at least two cloud platforms having different cloud architectures;
    adjusting an access interface of each cloud platform in the hybrid cloud by using a preset adapter, wherein the preset adapter is associated with a standard adaptee interface, the access interface of each cloud platform is encapsulated in the standard adaptee interface as a specific implementation class of the standard adaptee interface, the preset adapter provides a plurality of standard operation methods for user data management to the management platform, each standard operation method of the preset adapter is configured to call a corresponding operation method of the implementation class corresponding to the cloud platform;
    for each cloud platform in the hybrid cloud:
        determining, by the management platform according to a historical record, historical user data that has been distributed to the cloud platform;
        obtaining, by the management platform, incremental data of the user data relative to the historical user data; and
        sending, by the management platform, the incremental data to the cloud platform through the adjusted access interface by calling one or more of the standard operation methods of the preset adapter according to the incremental data, wherein the management platform is implemented using one or more hardware processors.

2. The user management method according to claim 1, further comprising:
    obtaining a sending result of each piece of data of the incremental data to the cloud platform; and
    recording the data in the historical record when the data are successfully sent to the cloud platform.

3. The user management method according to claim 2, further comprising:
    obtaining failure information when sending the incremental data to the cloud platform fails, the failure information comprising information indicating the incremental data and the cloud platform;
    adding the failure information to a message queue; and
    resending the incremental data correspond indicated by the failure information to the cloud platform indicated by the failure information.

4. The user management method according to claim 3, wherein the failure information further comprises an occurrence time of failure of sending the incremental data to the cloud platform; and the method further comprising:
    obtaining a current time; and
    sending a time-out notification when a time distance between the current time and the occurrence time is greater than a threshold, the time-out notification comprising the failure information.

5. The method according to claim 1, wherein:
    the standard operation methods of the preset adapter for managing the user data in all cloud platforms in the hybrid cloud is the same for upper layer calling; and
    differences in access interfaces of the at least two cloud platforms is transparent to a user of the RBAC system.

6. The method according to claim 1, wherein:
    the standard operation methods provided by the preset adapter include at least one of create data, update data, get data, and delete data.

7. The method according to claim 1, further comprising:
    connecting a new cloud platform to the hybrid cloud; and
    adjusting an access interface of the new cloud platform by using the preset adapter, wherein the access interface of the new cloud platform is encapsulated in the standard adaptee interface as a new implementation class of the standard adaptee interface, and upper-layer call relationships of the standard operation methods of the preset adapter remain the same.

8. A user management apparatus of a hybrid cloud, comprising a transceiver, a processor, and a non-transitory storage medium, the non-transitory storage medium storing computer instructions, when the processor executes the computer instructions, the processor being configured to:
    obtain user data in a role-based access control RBAC system, the user data being uniformly managed in all cloud platforms in the hybrid cloud, the hybrid cloud including at least two cloud platforms having different cloud architectures;
    adjust an access interface of each cloud platform in the hybrid cloud by using a preset adapter, wherein the preset adapter is associated with a standard adaptee interface, the access interface of each cloud platform is encapsulated in the standard adaptee interface as a specific implementation class of the standard adaptee interface, the preset adapter provides a plurality of standard operation methods for user data management, each standard operation method of the preset adapter is configured to call a corresponding operation method of the implementation class corresponding to the cloud platform;
    determine, according to a historical record, historical user data that has been distributed to each cloud platform in the hybrid cloud;
    obtain, for each cloud platform, incremental data of the user data relative to the historical user data, and
    send the incremental data to each cloud platform in the hybrid cloud through the adjusted access interface by calling one or more of the standard operation methods of the preset adapter according to the incremental data.

9. The user management apparatus according to claim 8, wherein the incremental data comprises at least one piece of data, and the processor is further configured to:
   obtain a sending result of each piece of incremental data to the cloud platform; and
   record the data in the historical record when the incremental data are successfully sent to the cloud platform.

10. The user management apparatus according to claim 9, wherein the processor is further configured to:
    obtain failure information of the incremental data when sending of the incremental data to the cloud platform fails, the failure information comprising information for indicating the incremental data and the cloud platform; and
    add the failure information to a message queue, wherein the transceiver is further configured to resend the incremental data indicated by the failure information in the message queue to the cloud platform indicated by the failure information.

11. The user management apparatus according to claim 10, wherein the failure information further comprises an occurrence time of failure of sending of the data to the cloud platform; and
    the processor is further configured to:
    obtain a current time; and
    send a time-out notification when a time difference between the current time and the occurrence time is greater than a threshold, the time-out notification comprising the failure information.

12. A non-transitory storage medium, configured to store one or more computer programs, the computer programs comprising instructions that can be run by a processor, and when the instructions are executed by the processor, enabling the processor of a management platform to perform:
    obtaining user data in a role-based access control RBAC system, the user data being uniformly managed in all cloud platforms in the hybrid cloud, the hybrid cloud including at least two cloud platforms having different cloud architectures;
    adjusting an access interface of each cloud platform in the hybrid cloud by using a preset adapter, wherein the preset adapter is associated with a standard adaptee interface, the access interface of each cloud platform is encapsulated in the standard adaptee interface as a specific implementation class of the standard adaptee interface, the preset adapter provides a plurality of standard operation methods for user data management to the management platform, each standard operation method of the preset adapter is configured to call a corresponding operation method of the implementation class corresponding to the cloud platform;
    for each cloud platform in the hybrid cloud:
    determining, according to a historical record, historical user data that has been distributed to the cloud platform;
    obtaining incremental data of the user data relative to the historical user data; and
    sending the incremental data to the cloud platform through the adjusted access interface by calling one or more of the standard operation methods of the preset adapter according to the incremental data.

13. The non-transitory storage medium according to claim 12, the method further comprising:
    obtaining a sending result of each piece of incremental data to the cloud platform; and
    recording the data in the historical record when the incremental data are successfully sent to the cloud platform.

14. The non-transitory storage medium according to claim 13, the method further comprising:
    obtaining failure information of the incremental data when sending of the incremental data to the cloud platform fails, the failure information comprising information for indicating the incremental data and the cloud platform;
    adding the failure information to a message queue; and
    resending the incremental data indicated by the failure information in the message queue to the cloud platform indicated by the failure information.

15. The non-transitory storage medium according to claim 14, wherein the failure information further comprises an occurrence time of failure of sending of the data to the cloud platform; and the method further comprising:
    obtaining a current time; and
    sending a time-out notification when a time difference between the current time and the occurrence time is greater than a threshold, the time-out notification comprising the failure information.

* * * * *